Nov. 11, 1924.

D. LOSSIUS

ASSEMBLING TOOL

Filed June 30, 1922

1,515,349

Inventor
Dagfinn Lossius
By his Attorney
Robert S. Blair

Patented Nov. 11, 1924.

1,515,349

UNITED STATES PATENT OFFICE.

DAGFINN LOSSIUS, OF PHILADELPHIA, PENNSYLVANIA, ASSIGNOR TO FRANK MOSSBERG COMPANY, OF ATTLEBORO, MASSACHUSETTS, A CORPORATION OF RHODE ISLAND.

ASSEMBLING TOOL.

Application filed June 30, 1922. Serial No. 571,924.

*To all whom it may concern:*

Be it known that I, DAGFINN LOSSIUS, a subject of the Kingdom of Norway, and a resident of Philadelphia, in the county of Philadelphia and State of Pennsylvania, have invented an Improvement in Assembling Tools, of which the following is a specification.

This invention relates to construction for assembling tools and, with regard to its more specific features, to construction for such tools adapted for use in assembling universal joints and the like. One of the objects thereof is to provide a construction of the above nature which will operate in a thoroughly dependable and efficient manner. Another object is to provide a construction of the above nature which is strong and reliable and well adapted to meet the requirements of practical use. Another object is to provide a construction of the above nature which is simply and inexpensively made. Other objects will be in part obvious or in part pointed out hereinafter.

The invention accordingly consists in the features of construction, combinations of elements and arrangements of parts as will be exemplified in the structure to be hereinafter described and the scope of the application of which will be indicated in the following claims.

In the accompanying drawing, in which is shown one of the various possible embodiments of this invention, Figure 1 shows a universal joint and its associated parts with an assembling tool in operative position;

Similar reference characters refer to similar parts throughout the several views of the drawings.

Figure 1:
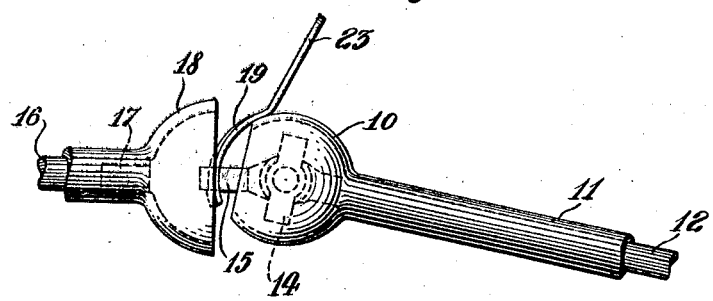

Referring now to the drawings in detail, there is shown in Fig. 1 a diagrammatic representation of a universal joint and its associated parts such as are commonly employed, for example, in the construction of Ford automobiles. In this instance there is a spherical housing 10 forming part of a shaft housing 11 which extends rearwardly of the car to the differential gear housing and which encases the drive shaft 12. The spherical housing 10 encloses a universal joint 14, the rear member of which is joined to the drive shaft 12 and the forward member of which is provided with a squared end or lug 15 projecting outwardly through the open end of the housing 10. A drive shaft 16 extends from the reversing gearing and the motor of the car and at its rear end is provided with a squared recess 17 adapted to receive the lug 15 of the universal joint. About the end of the shaft 16 is supported in any suitable manner a cup-shaped casing 18 with whose interior surface the spherical housing 10 is adapted to register.

It will readily be seen that in assembling the above-described mechanism as the housing 10 is thrust into the cup-shaped casing 18 it is desirable to have a tool which will support the lug 15 to guide it into the recess 17 and, in addition, it may be necessary to turn the lug 15 in order to make it register with the recess. When the housing 10 has been inserted within the casing 18 to a sufficient depth to permit entrance of the lug 15 into the recess 17 the space between the housing 10 and the interior of casing 18 is small, and provision must be made for the removal of the tool. The provision of an assembling tool which will meet the above requirements in a satisfactory manner is one of the dominant aims of this invention.

Figure 2:
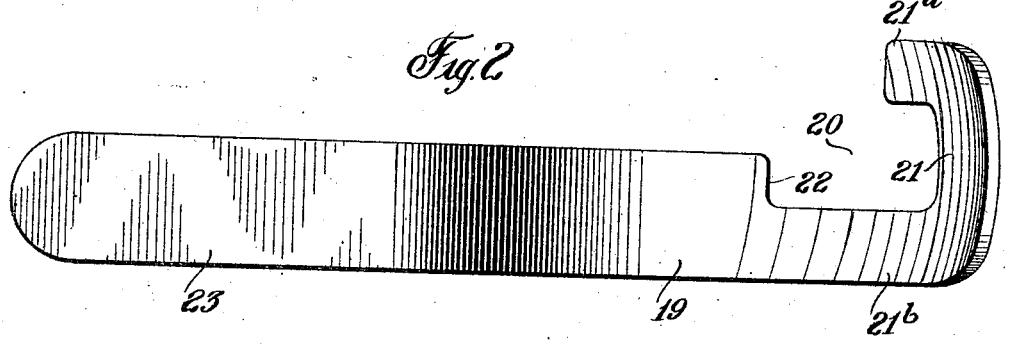
Figure 2 is a plan view of the tool shown in Fig. 1.
Figure 3:
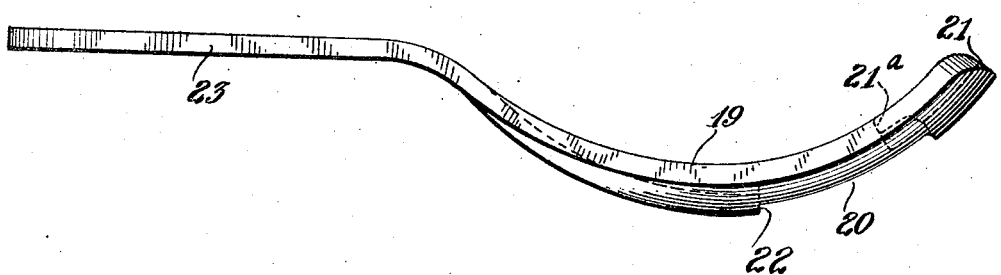
Figure 3 is a side elevation of the tool shown in Figs. 1 and 2.

Referring now to Fig. 2, there is shown in enlarged detail a tool which is preferably constructed of thin sheet metal and which has a portion 19 whose face is preferably shaped to conform substantially to a portion of the surface of the spherical housing 10. The shape of this portion 19 may be better realized by reference to Fig. 3. Adjacent the end of the concave or dished portion 19 is provided an opening designated by the numeral 20 in Fig. 2 formed between the end portion 21 of the tool and a shoulder 22. The other end 23 of the tool provides a handle.

Referring again to Fig. 1, the tool is shown in operative position with regard to the universal joint above described. The dished portion 19 of the tool is inserted between the housing 10 and the casing 18, and the lug 15 is engaged in the recess 20 of the tool which is of a size and shape, between the portions 21ª and 21ᵇ, adapted to receive it. The housing 10 is then thrust into the casing 18 and, by means of the tool, the lug 15 may be supported and guided into the recess 17 and at the same time turned, if necessary, in order to make it register with the recess 17. The housing 10 may be inserted until only the thickness of the stock of the tool separates it from the walls of casing 18, after which the tool may easily be removed by simply sliding it over the spherical wall of the housing 10.

It will thus be seen that there is herein provided an apparatus which embodies the various features of this invention, which apparatus in its action attains the various objects of the invention, and that the same is well adapted to meet the conditions of hard practical use.

As many possible embodiments may be made of the above invention and as many changes might be made in the embodiment herein set forth, it is to be understood that all matter hereinbefore set forth or shown in the accompanying drawings is to be interpreted as illustrative and not in a limiting sense.

I claim as my invention:

1. An assembling tool comprising a handle portion and a substantially spherically dished portion having formed therein a recess adapted to engage and turn a non-circular member.

2. An assembling tool comprising a handle portion and a portion of substantially thin material shaped to conform substantially with a portion of the surface of a sphere and having formed therein a recess adapted to engage and turn a non-circular member.

3. A tool for assembling a universal joint having a housing thereabout and a casing into which said housing fits comprising a handle portion, a portion adapted to engage and rotate the projecting end of said universal joint, and an intermediate portion shaped to substantially the contour of the inner surface of said casing.

4. A tool for assembling a universal joint having a housing thereabout and a casing into which said housing fits comprising a handle portion, and a portion shaped to substantially the contour of the inner surface of said casing, said last portion having formed therein a recess adapted to support and turn the projecting end of said universal joint.

5. A tool for assembling a universal joint having a housing thereabout and a casing into which said housing fits comprising a handle portion, and a portion one surface of which is shaped substantially to the contour of said housing and the other surface of which is shaped substantially to the contour of said casing into which said housing fits, said last portion having a recess adapted to engage and guide the projecting end of said universal joint.

6. A tool for assembling a universal joint having a housing thereabout and a casing into which said housing fits comprising a handle member, the portion of substantially thin material dished substantially to the contour of the inner surface of said casing, and a recess in said last portion adapted to engage and turn the projecting lug of said universal joint.

In testimony whereof, I have signed my name to this specification this 26th day of June, 1922.

DAGFINN LOSSIUS.